(12) United States Patent
Chaillie

(10) Patent No.: US 6,601,421 B1
(45) Date of Patent: Aug. 5, 2003

(54) DEVICE FOR LIMITING BENDING IN A FLEXIBLE MEANS AND KEY HOUSING COMPRISING SAME

(75) Inventor: Frederic Chaillie, Pechbonnieu (FR)

(73) Assignee: Siemens Automotive S.A., Toulouse Cedex (FR)

( * ) Notice: Subject to any disclaimer, the term of this patent is extended or adjusted under 35 U.S.C. 154(b) by 0 days.

(21) Appl. No.: 09/936,222
(22) PCT Filed: Mar. 16, 2000
(86) PCT No.: PCT/EP00/02358
§ 371 (c)(1),
(2), (4) Date: Jan. 2, 2002
(87) PCT Pub. No.: WO00/55457
PCT Pub. Date: Sep. 21, 2000

(30) Foreign Application Priority Data

Mar. 17, 1999 (FR) .............................................. 99 03288

(51) Int. Cl.⁷ .............................................. E05B 19/04
(52) U.S. Cl. ............................. 70/408; 70/395; 70/278.1
(58) Field of Search ......................... 70/395, 408, 278.1

(56) References Cited

U.S. PATENT DOCUMENTS

| 4,888,970 A | * | 12/1989 | Kinzler et al. | ............. 70/408 X |
| 4,922,736 A | * | 5/1990 | Tanaka et al. | ................. 70/277 |
| 5,768,925 A | * | 6/1998 | Ozawa et al. | ................. 70/408 |

* cited by examiner

Primary Examiner—Suzanne Dino Barrett
(74) Attorney, Agent, or Firm—Young & Thompson

(57) ABSTRACT

A device adapted to limit the bending of a flexible tongue (15) in a bending direction includes an abutment (18) disposed in this direction at a distance (19) from the deformable end of the tongue (15). As a confinement device for a substantially flat object (7), includes a lower portion (1) supporting at least one locking element (15) flexible in a bending direction, and a member (18) for limiting bending of the locking element (15) in this direction. Application particularly to an electromagnetic automotive key housing with a removable button battery (7).

3 Claims, 1 Drawing Sheet

DEVICE FOR LIMITING BENDING IN A FLEXIBLE MEANS AND KEY HOUSING COMPRISING SAME

BACKGROUND OF THE INVENTION

The present invention is in the field of battery operated devices, in which confinement abutments are necessary. It relates in particular to blocking in position a button battery in a telecontrol housing (also called a coded key), for opening/closing the doors of a vehicle.

DESCRIPTION OF THE RELATED ART

There are conventionally known automobile keys using an electronic code transmitted to the vehicle when the user pushes on a button located on the key. These keys generally require an internal source of electrical energy, which usually takes the form of a button battery, which is a thin disc, for example 16 mm in diameter and 2 mm thick.

Such batteries must be able to be installed when the key is first used, and then eventually be replaced when they become discharged after several years. Thus, the housing of the key is conventionally made of two nesting parts, and the device for blocking the battery in position comprises one or several fixed abutments, of rigid plastic material, and a thin locking finger, whose flexibility permits, by resilient deformation, introducing the battery in place, and which then returns to a position preventing movement of the battery from its recess.

It will be understood that such devices have the drawback that the locking finger is very fragile, and handling, both during the first installation of the battery as well as during replacement of the latter, can lead to breakage of the locking finger. The battery is then no longer suitably blocked in its recess.

EP 0 5080 886 describes a confinement device for a flat battery of the button type by means of lugs and/or bearings associated with leaf springs adapted to effect electrical contacts. The problem this document seeks to solve consists in avoiding leaving access to the electronic components during changing the battery. The problem of wear and of rupture of the lugs is not addressed.

DE4226578 describes an automotive remote control housing integrating a device for confining flat batteries, of the button type, in which the batteries are held in place by the cover and because of this fall upon opening the housing. There are no lugs or retaining means for the battery in the lower part of the housing and the problem of wear and of breakage of these elements is not addressed.

SUMMARY OF THE INVENTION

The present invention solves the preceding problem and provides for this purpose a device that is simple to make and inexpensive.

According to the invention, the device adapted to limit the bending of a flexible means in one bending direction, comprises an abutment disposed in this direction at a distance from the deformable end of the flexible means.

The invention provides a device for confining a flat battery of the button type for an automotive key housing, comprising a lower portion supporting at least one locking finger flexible in one direction of bending, characterized in that the lower portion comprises an abutment limiting the bending of the locking finger in this direction, said abutment being spaced from the locking finger in the direction of bending sufficiently to permit the emplacement of the battery to be confined whilst preventing the locking finger from leaving its resilient bending range.

Preferably, the means for limiting bending is an abutment disposed at a small distance from the locking finger, in the direction of bending, the space between the locking finger and the abutment being sufficient to permit the emplacement of the object to be confined whilst preventing the locking finger from leaving its resilient bending range.

According to a particular embodiment, corresponding in particular to the use for an electronic key housing, the device also comprises an upper portion, nestable on the lower portion, this upper portion comprising preferably a corner adapted to be disposed, when the housing is assembled, between the locking finger and the abutment.

It will be understood that this finger is adapted to hold the locking finger in blocked position of the confined object, when the housing is closed.

To limit the movement of the object confined in the case of breakage of the locking finger, the upper portion of the housing preferably comprises a projection bearing on the object, when the upper portion is assembled on the lower portion.

BRIEF DESCRIPTION OF THE DRAWINGS

The description and drawings which follow permit better understanding of the objects and advantages of the invention. It is clear that this description is given only by way of example, and is not limiting in character.

In the drawings.

DESCRIPTION OF THE PREFERRED EMBODIMENTS

Figure 1:
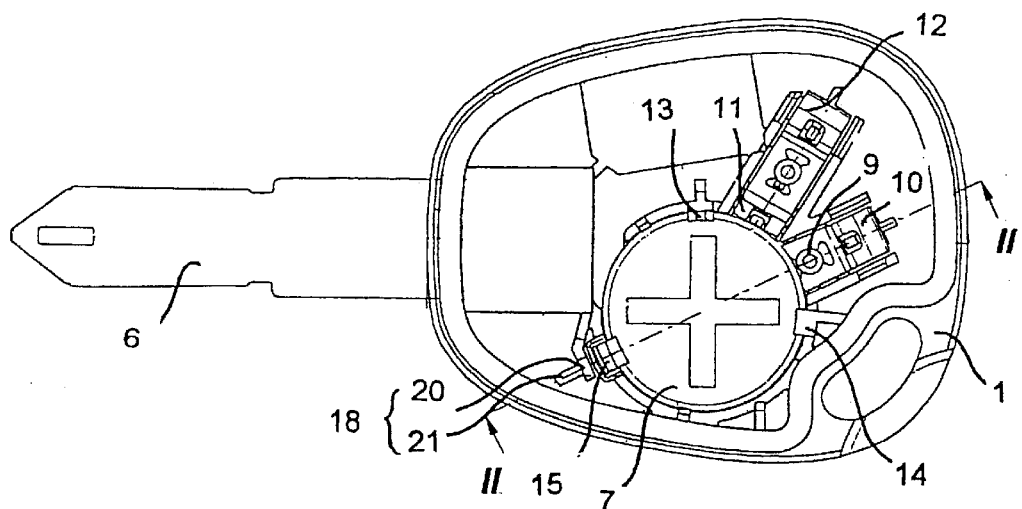
FIG. 1 shows in a plan view a lower portion of an automobile key.

An automobile code key conventionally comprises a housing in two parts: a lower portion 1 and an upper portion 2. These two parts 1, 2 fit together by a releasable nesting device 3, conventional in nature and not described here in detail.

The code key thus usually comprises in its upper portion 2 a control button 4 whose pressure actuates an electronic circuit 5 adapted to send an electromagnetic identification message to a distant vehicle.

In present devices, the key also comprises blade 6, adapted to start the vehicle.

So as to supply the electronic circuit 5, a battery 7, of the button battery type, is disposed in the bottom of the lower part 1 of the key housing, forming a base.

The button battery 7 rests on a leaf spring 8, to facilitate its removal and to ensure electrical contact with one of the terminals of the button battery 7. This leaf spring 8 is secured by being forcibly sunk on a pin 9, and its second end 10 serves as a point of first supply contact with electronic circuit 5.

A second spring ensures electrical contact with its first end 11 with the other electrode of the button battery 7, and its second end 12 serves as the second electrical supply contact for the electronic circuit 5. It will be understood that these two springs thus permit the supply of the electronic circuit 5 by the button battery 7, removably when the two portions of the housing are separated.

The button battery 7 is held in position in its recess, on the one hand by two rigid abutments 13, 14, of substantially inverted "L" shape, comprising a lug extending slightly above the button battery 7, disposed for example at about 90° from each other along the circumference of the button battery 7.

On the other hand, a flexible locking finger 15 is disposed on the lower portion 1 of the housing so as to be located substantially along the circumference of the button battery 7, in a position opposite the rigid abutments 13, 14.

There will be defined hereafter in the description, a bending direction of the locking finger 15 (which here is common to the direction defined by the locking finger 15 and the center of the button battery 7), corresponding to the plane II—II in FIG. 1, a transverse direction as being the direction perpendicular to the securement direction in the plane of the button battery 7, and a vertical direction as being the direction perpendicular to the principal plane of the key (which is to say perpendicular to the plane of FIG. 1).

This locking finger 15 comprises a thin blade 16 extending substantially along the vertical direction, and being in a portion extending above the recess of the button battery 7. This thin blade 16 has its least thickness in the bending direction, and because of this, it gives to the locking finger 15 its flexibility in this direction. In the present non-limiting example, this thickness is of the order of 0.5 mm.

The upper portion 17 of the locking finger 15 is beveled such that simply bearing on a button battery 7 disposed above its recess gives rise to the elastic return by bending of the locking finger 15 in the bending direction, and permits the passage of the button battery 7 toward its recess.

An abutment 18 for limiting the elastic return of the locking finger 15 is disposed slightly behind the deformable end (upper) of the locking finger 15, in the bending direction of the locking finger 15.

The spacing 19 left between the locking finger 15 and the abutment 18 for limiting elastic return, is sufficient to permit the emplacement of the button battery 7, whilst preventing the locking finger 15 from leaving its resilient range of bending in the bending direction.

Figure 2:
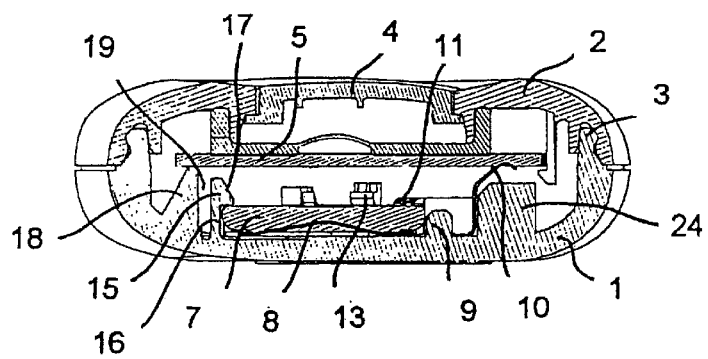
FIG. 2 shows a cross-sectional view of the key housing.

The abutment 18 is preferably made of "T" shape, as is seen in FIG. 1, with a flat portion 20 substantially parallel to the thin blade 16 of the locking finger 15, and a mechanical reinforcement 21 perpendicular to this flat portion 20, and for example of substantially triangular shape, as shown in FIG. 2.

The abutment 18 is preferably of a height suitable to bear against the electronic circuit 5, when the key housing is closed, so as to ensure better mechanical holding of this latter.

The rigid abutments 13, 14, the locking finger 15 and the limiting abutment 18 are made in the conventional manner, and for example directly during molding of the lower portion 1 of the housing.

Figure 3:
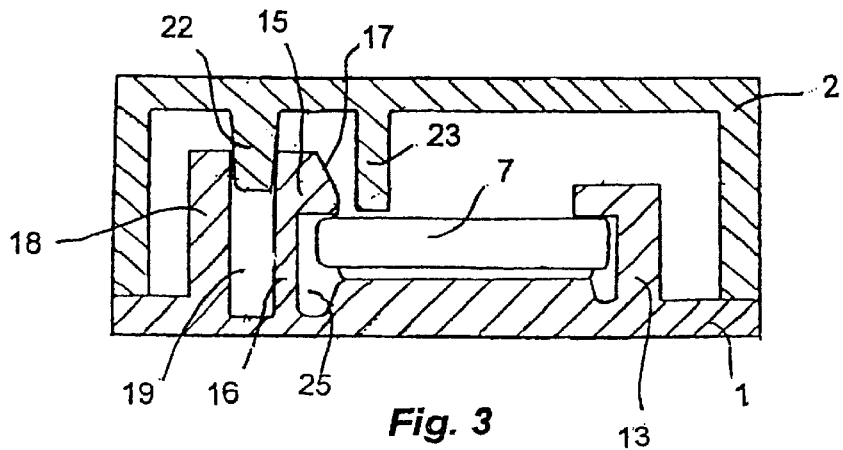
FIG. 3 shows schematically a side cross-sectional view of a modification of the device according to the invention.

In a modified embodiment, shown in FIG. 3, the upper portion 2 of the key housing comprises a wedge 22 adapted to be disposed, when the housing is assembled, between the locking finger 15 and the abutment 18. The upper portion 2 of the housing also comprises a projection 23 for bearing on the button battery 7, when the housing is closed. This projection 23 is adapted to prevent the button battery from leaving its recess, if the locking finger 15 were to be broken and hence no longer hold the battery in place.

In another modification, a spring abutment 24 is disposed below the second end 10 of the leaf spring 8, so as also to limit the clearance of this end of the leaf spring, and hence to reduce the risk of permanent deformation or breakage.

In still another modification (FIG. 3), the button battery 7 is disposed on a base formed in the lower portion 1. This base being disposed slightly above the foot of the locking finger 15, thereby defining a complementary height 25, which increases the resilient flexibility of the thin blade 16.

In still another modification (not shown), the rigid abutments 13, 14 are replaced with flexible locking fingers 15, these locking fingers 15 comprising abutments 18 for limiting bending.

What is claimed is:

1. Device for holding a flat battery (7) of the button type for an automotive key housing, comprising:

a lower portion (1) supporting at least one locking finger (15) flexible in one bending direction, the lower portion (1) comprises an abutment (18) for limiting bending of the locking finger in the bending direction, said abutment being spaced from the locking finger in the direction of bending sufficiently to permit the emplacement of the battery (7) to be confined whilst preventing the locking finger (15) from exceeding a resilient bending range of the locking finger, the abutment (18) being of T shape, with a flat portion (20) perpendicular to the bending direction of the locking finger (15), and a mechanical reinforcement (21) parallel to the bending direction of the locking finger.

2. Device according to claim 1, further comprising an upper portion (2), receivable on the lower portion (1), this upper portion (2) comprising a wedge (22) adapted to be disposed, when the housing is assembled, between the locking finger (15) and the abutment (18).

3. Device according to claim 2, wherein the upper portion (2) of the housing also comprises a projection (23) bearing on the battery (7), when the upper portion (2) is assembled on the lower portion (1).

* * * * *